US012613694B2

(12) United States Patent
Verma et al.

(10) Patent No.: US 12,613,694 B2
(45) Date of Patent: Apr. 28, 2026

(54) SYSTEM AND METHOD FOR CUSTOMIZING LOGSTASH SNMP INPUT PLUGIN

(71) Applicant: Rakuten Mobile, Inc., Tokyo (JP)

(72) Inventors: Jayesh Verma, Indore (IN); Vivek Nagar, Indore (IN)

(73) Assignee: RAKUTEN MOBILE, INC., Tokyo (JP)

(*) Notice: Subject to any disclaimer, the term of this patent is extended or adjusted under 35 U.S.C. 154(b) by 608 days.

(21) Appl. No.: 18/247,738

(22) PCT Filed: Dec. 14, 2022

(86) PCT No.: PCT/US2022/052790
§ 371 (c)(1),
(2) Date: Apr. 3, 2023

(87) PCT Pub. No.: WO2024/129071
PCT Pub. Date: Jun. 20, 2024

(65) Prior Publication Data
US 2025/0088405 A1     Mar. 13, 2025

(51) Int. Cl.
| | |
|---|---|
| *G06F 9/44* | (2018.01) |
| *G06F 8/65* | (2018.01) |
| *G06F 8/71* | (2018.01) |
| *G06F 8/76* | (2018.01) |
| *H04L 41/0213* | (2022.01) |
| *H04L 41/0823* | (2022.01) |

(52) U.S. Cl.
CPC .................. *G06F 8/71* (2013.01); *G06F 8/65* (2013.01); *G06F 8/76* (2013.01); *H04L 41/0213* (2013.01); *H04L 41/0823* (2013.01)

(58) Field of Classification Search
CPC ................. G06F 8/71; G06F 8/65; G06F 8/76
See application file for complete search history.

(56) References Cited

U.S. PATENT DOCUMENTS

| | | | | |
|---|---|---|---|---|
| 9,880,814 B1* | 1/2018 | Fisher | ..................... | H04L 67/34 |
| 2013/0262845 A1* | 10/2013 | Pearson | .................... | G06F 8/71 |
| | | | | 713/1 |
| 2015/0319043 A1* | 11/2015 | Dibirdi | .............. | H04L 41/0886 |
| | | | | 370/254 |
| 2017/0199808 A1* | 7/2017 | Campbell | ........... | G06F 11/3644 |
| 2023/0246969 A1* | 8/2023 | Ros Giralt | ............. | H04L 45/02 |
| | | | | 370/235 |

\* cited by examiner

*Primary Examiner* — Hang Pan
(74) *Attorney, Agent, or Firm* — HAUPTMAN HAM, LLP

(57) ABSTRACT

A Logstash SNMP input plugin is customized to work in an IPv6 environment. A cloned copy of the Logstash SNMP Input Plugin is debugged to identify modifications to make to the cloned copy of the Logstash SNMP Input Plugin to enable operation in the IPv6 environment. The cloned copy of the Logstash SNMP Input Plugin is updated to implement the modifications to enable operation in the IPv6 environment. The updated cloned copy of the Logstash SNMP Input Plugin is recompiled to generate a custom SNMP Input Plugin. The custom SNMP Input Plugin is installed into Logstash. Logstash with the custom SNMP Input Plugin installed is deployed and tested in the IPv6 environment. Upon discovering further issues, the custom SNMP Input Plugin is debugged. In response to discovering no further issues, Logstash with the custom SNMP Input Plugin installed is released for use in the IPv6 environment.

20 Claims, 7 Drawing Sheets

SYSTEM AND METHOD FOR CUSTOMIZING LOGSTASH SNMP INPUT PLUGIN

RELATED APPLICATIONS

The present application is a National Phase of International Application No. PCT/US2022/052790 filed Dec. 14, 2022.

TECHNICAL FIELD

This description relates to customizing Logstash SNMP input plugin to work in an IPv6 environment, and method of using the same.

BACKGROUND

One way to manage devices on an IP network involves using Simple Network Management Protocol (SNMP). SNMP is used by different devices (routers, switches, servers, workstations, printers, etc.) on the network to check activity and communicate important information. SNMP relies on an architecture which includes a manager and an agent. To generate SNMP messages, an SNMP trap is used to capture system monitoring information that is sent as an asynchronous notification from a SNMP agent to a SNMP manager, e.g., Logstash. A SNMP trap is a type of PDU, through which an agent sends an unrequested message or notification to the SNMP manager about events regarding objects in the managed device.

To capture and send SNMP messages, SNMP is enabled in a managed device. The TCP/IP (Transmission Control Protocol/Internet Protocol) suite specifies two protocols for the transport layer: User Datagram Protocol (UDP) and Transmission Control Protocol (TCP). SNMP uses UDP as its transport protocol. Each instance of a message is serialized, e.g., encoded onto a single UDP over IPv4 datagram. UDP datagrams are transmitted without provision for an acknowledgment. UDP is connectionless because there is no virtual connection between sender and receiver.

Logstash is used to process messages from SNMP traps. Logstash is an open-source, server-side data processing pipeline that is used for collecting, processing, managing, storing and searching events and logs. Logstash is able to collect data from multiple sources, transform the data on the fly, and send the data to a destination. Logstash is able to be used as a data pipeline for providing data to Elasticsearch, which is an open-source analytics and search engine.

Collection of logs from SNMP traps is accomplished via configurable input plugins. For Logstash, the SNMP input plugin supports UDP with IPv4. However, connecting to the SNMP trap using the SNMP input plugin in an IPv6 environment results in errors and data is not able to be ingested by Logstash.

SUMMARY

In at least embodiment, a method for customizing a Logstash SNMP input plugin to work in an IPv6 environment includes debugging a cloned copy of a Logstash SNMP Input Plugin to identify modifications to make to the cloned copy of the Logstash SNMP Input Plugin to enable operation in an IPv6 environment, updating the cloned copy of the Logstash SNMP Input Plugin to implement the modifications to enable operation in the IPv6 environment, recompiling the updated cloned copy of the Logstash SNMP Input Plugin to generate a custom SNMP Input Plugin, installing the custom SNMP Input Plugin into Logstash, deploying and testing Logstash in the IPv6 environment with the custom SNMP Input Plugin installed, in response to the deploying and testing determining that Logstash works in the IPv6 environment with the custom SNMP Input Plugin installed, releasing Logstash with the custom SNMP Input Plugin installed for use in the IPv6 environment, and in response to the deploying and testing determining Logstash has issues with SNMP in the IPv6 environment, debugging the custom SNMP Input Plugin to identify one or more additional classes and methods of the custom SNMP Input Plugin causing the custom SNMP Input Plugin to not work in the IPv6 environment.

In at least one embodiment, a, includes a memory storing computer-readable instructions, and a processor connected to the memory, wherein the processor is configured to execute the computer-readable instructions to debug a cloned copy of a Logstash SNMP Input Plugin to identify modifications to make to the cloned copy of the Logstash SNMP Input Plugin to enable operation in an IPv6 environment, update the cloned copy of the Logstash SNMP Input Plugin to implement the modifications to enable operation in the IPv6 environment, recompile the updated cloned copy of the Logstash SNMP Input Plugin to generate a custom SNMP Input Plugin, install the custom SNMP Input Plugin into Logstash, deploying and testing Logstash in the IPv6 environment with the custom SNMP Input Plugin installed, in response to the deploying and testing determining that Logstash works in the IPv6 environment with the custom SNMP Input Plugin installed, release Logstash with the custom SNMP Input Plugin installed for use in the IPv6 environment, and in response to the deploying and testing determining Logstash has issues with SNMP in the IPv6 environment, debug the custom SNMP Input Plugin to identify one or more additional classes and methods of the custom SNMP Input Plugin causing the custom SNMP Input Plugin to not work in the IPv6 environment.

In at least one embodiment, a non-transitory computer-readable media having computer-readable instructions stored thereon, which when executed by a processor causes the processor to perform operations including debugging a cloned copy of a Logstash SNMP Input Plugin to identify modifications to make to the cloned copy of the Logstash SNMP Input Plugin to enable operation in an IPv6 environment, updating the cloned copy of the Logstash SNMP Input Plugin to implement the modifications to enable operation in the IPv6 environment, recompiling the updated cloned copy of the Logstash SNMP Input Plugin to generate a custom SNMP Input Plugin, installing the custom SNMP Input Plugin into Logstash, deploying and testing Logstash in the IPv6 environment with the custom SNMP Input Plugin installed, in response to the deploying and testing determining that Logstash works in the IPv6 environment with the custom SNMP Input Plugin installed, releasing Logstash with the custom SNMP Input Plugin installed for use in the IPv6 environment, and in response to the deploying and testing determining Logstash has issues with SNMP in the IPv6 environment, debugging the custom SNMP Input Plugin to identify one or more additional classes and methods of the custom SNMP Input Plugin causing the custom SNMP Input Plugin to not work in the IPv6 environment.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
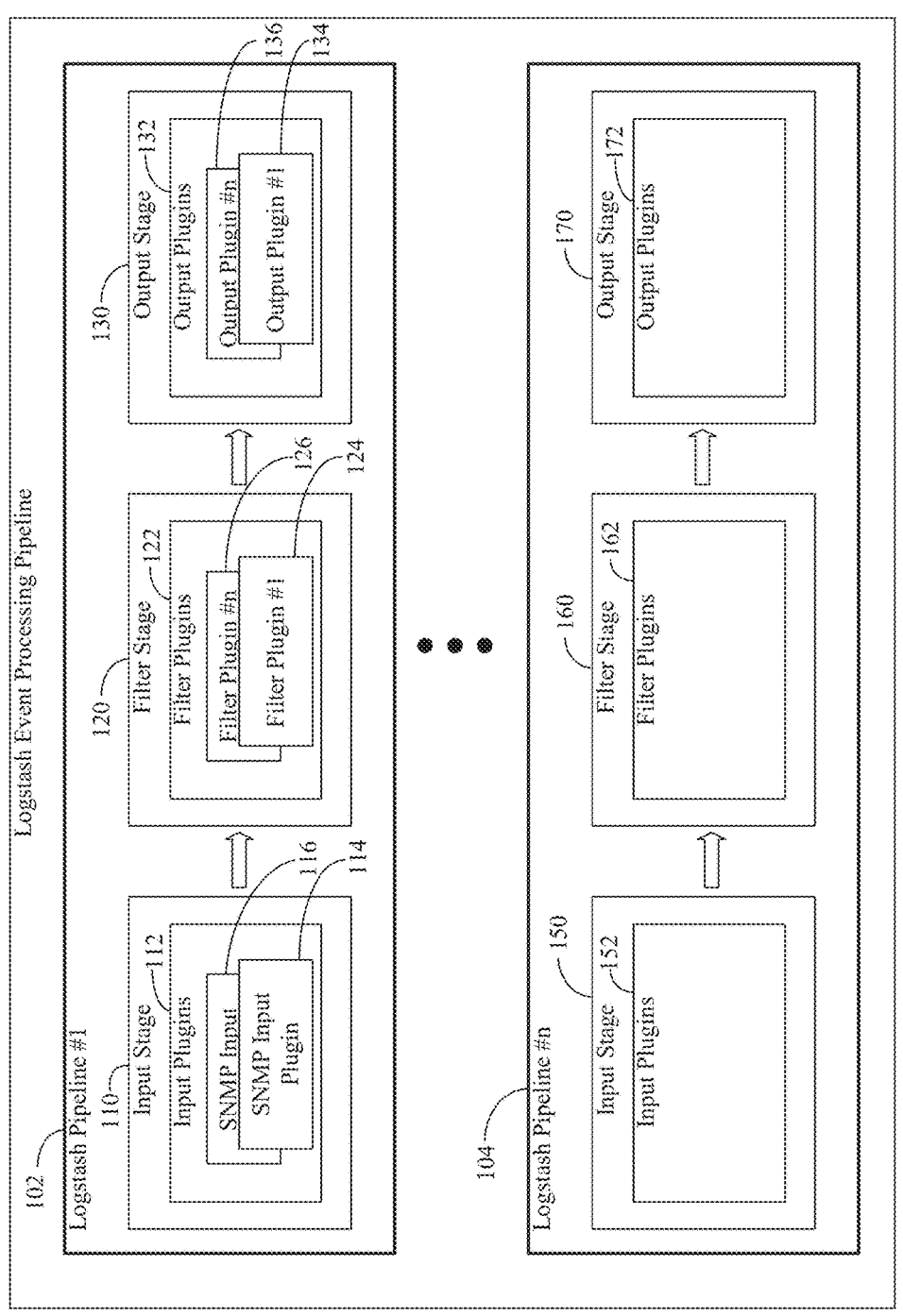
FIG. 1 is a diagram of Logstash Event Processing Pipeline according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or substantially any data-stream or signaling-stream from UE.

In at least one embodiment, a Logstash SNMP input plugin is customized to work in an IPv6 environment by debugging a cloned copy of a Logstash SNMP Input Plugin to identify modifications to make to the cloned copy of the Logstash SNMP Input Plugin to enable operation in an IPv6 environment, updating the cloned copy of the Logstash SNMP Input Plugin to implement the modifications to enable operation in the IPv6 environment, recompiling the updated cloned copy of the Logstash SNMP Input Plugin to generate a custom SNMP Input Plugin, installing the custom SNMP Input Plugin into Logstash, deploying and testing Logstash in the IPv6 environment with the custom SNMP Input Plugin installed, in response to the deploying and testing determining that Logstash works in the IPv6 environment with the custom SNMP Input Plugin installed, releasing Logstash with the custom SNMP Input Plugin installed for use in the IPv6 environment, and in response to the deploying and testing determining Logstash has issues with SNMP in the IPv6 environment, debugging the custom SNMP Input Plugin to identify one or more additional classes and methods of the custom SNMP Input Plugin causing the custom SNMP Input Plugin to not work in the IPv6 environment.

Embodiments described herein provide a method that provides one or more advantages. For example, customizing the Logstash SNMP input plugin to work in an IPv6 environment enables users to avoid the use of external paid plugins. The custom Logstash SNMP input plugin produces faster results and is a value addition in open source components. The custom Logstash SNMP input plugin also reduces cost and saves time.

FIG. 1 is a diagram of Logstash Event Processing Pipeline 100 according to at least one embodiment.

As shown in FIG. 1, Logstash Event Processing Pipeline 100 is able to have more than one instance of a pipeline. In FIG. 1, Logstash Event Processing Pipeline 100 has a first instance of a Logstash Pipeline, Logstash Pipeline #1 102. Additional instances of Logstash pipelines are represented by Logstash Pipeline #n 104.

Logstash Pipeline #1 102 has three stages: Input Stage 110, Filter Stage 120, and Output Stage 130. Input Stage 110 generates events, Filter Stage 120 modifies the received data in the events, and Output Stage 130 ships data to destination sources, such as Elasticsearch, Amazon Web Services (AWS) Cloudwatch, etc. Input Stage 110 and Output Stage 130 support codecs that enable encoding or decoding of the data as the data enters or exits the Logstash Event Processing Pipeline 100 without using a separate filter. The Input Stage 110, Filter Stage 120, and Output Stage 130 are able to be configured with buffers, parallel processing, or other efficiency and scaling techniques. However, the details of the operation between the Input Stage 110, Filter Stage 120, and Output Stage 130 go beyond the scope of embodiments described herein and are not described in detail.

Logstash plugins are available in self-contained packages called gems and are hosted in online repositories. After a Logstash plugin is successfully installed, the plugin is able to be used in a Logstash configuration file. A Logstash configuration file is able to have three separate sections for the types of plugin that are to be added to the Logstash Event Processing Pipeline 100. The first section of the Logstash configuration file is for Input Plugins 112. In FIG. 1, SNMP Input Plugins 114, 116 are shown installed in the Input Stage 110. SNMP Input Plugins 114, 116 are able to be SNMP Version 2 (V2) Input Plugins 114, 116, but embodiments described herein are not so limited. SNMP Input Plugins 114, 116 are used to detect and address failures in devices and connections for the purposes of maintaining compliance and network security.

The second section of the Logstash configuration file is for Filter Plugins 122. Filter Plugins 122 are optional. In FIG. 1, Filter Plugins 124, 126 are shown installed in the Filter Stage 120. The third section of the Logstash configuration file is for Output Plugins 132 (e.g., ElasticSearch). In FIG. 1, Output Plugins 134, 136 are shown installed in the Output Stage 130.

In Logstash Pipeline #1 102, different types and combinations of plugins are able to be used at Input Stage 110, Filter Stage 120, and Output Stage 130 depending on the goals of the user.

Other instances of Logstash pipelines, such as Logstash Pipeline 104, are able to be similarly configured with Input Plugins 152 at the Input Stage 150, Filter Plugins 162 at the Filter Stage 160, and Output Plugins 172 at the Output Stage 170. However, as with Logstash Pipeline #1 102, different types and combinations of plugins are able to be used at Input Stage 150, Filter Stage 160, and Output Stage 170.

Input Plugins 112 used at the Input Stage 110 of the Logstash Pipeline #1 enable a user to capture logs from various sources like Web Servers, Databases, Simple Network Management Protocol (SNMP) servers, etc. Input Plugins 112 of Logstash enable a specific source of events to be read by Logstash, e.g., SNMP Traps. After capturing events, Filter Plugins 122 at the Filter Stage 120 are used by Logstash to parse and transform the data into meaningful information. Lastly, the Output Stage 130 of the Logstash Pipeline #1 102 sends or stores the information to various destination sources like Elasticsearch, AWS Cloudwatch, etc.

Logstash also provides the option to install a locally built plugin that is packaged as a ruby gem. Using SNMP Input Plugin 114, Logstash gathers information related to the current state of operation of a device using SNMP. The SNMP Input Plugin 114 uses transport protocols, such as User Datagram Protocol (UDP) and Transport Control Protocol (TCP).

SNMP Input Plugin 114 works in an IPv4 environment. However, SNMP Input Plugin 114 does not work in an IPv6 environment. The logs of Logstash show an error in snmptrap.rb classes associated with the SNMP Input Plugin 114. For example, Logstash cannot use SNMP Input Plugin with IPv6 because Logstash does not include support for IPv6, i.e., configurations to SNMP Input Plugin have not been made to enable ipv6 support. The notation of IPv4 is different from IPv6, which causes validation to fail in response to the network type being changed from IPv4 to IPv6. For example, an IPv4 address, e.g., 192.168.1.1, is able to be parsed, but support for parsing an IPv6 type address, e.g., 2001:0db8:1f70:0999:0de8:7648:3a49:06e8, is not included and thus an error is generated in the Logstash logs. In at least one embodiment, the code for SNMP Input Plugin 114 is modified to handle IPv6 type of addresses so that the SNMP Input Plugin 114 works in the IPv6 environment. The modified code for SNMP Input Plugin 114 is then recompiled and the modified (custom) SNMP Input Plugin 114 is reinstalled in Logstash so that Logstash is able to ingest data from SNMP traps in an IPv6 environment.

Figure 2A:
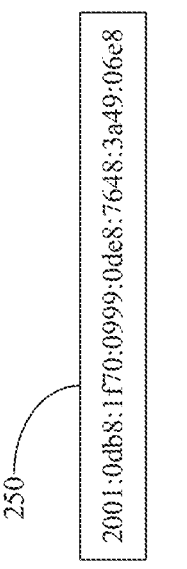
FIG. 2A shows an Internet Protocol (IP) version 4 (IPv4) address according to at least one embodiment.

FIG. 2A shows an Internet Protocol (IP) version 4 (IPv4) address 200 according to at least one embodiment.

IP (Internet Protocol) address 200 is a numerical label assigned to each device connected to a computer network that uses the IP protocol for communication. IP address 200 acts as an identifier for a specific device on a particular network. IP address 200 is also referred to as an IP number or Internet address.

IP address 200 specifies the technical format of the addressing and packets scheme. Networks combine IP with a TCP (Transmission Control Protocol) to provide virtual connections between a destination and a source. IPv4 is an IP version widely used to identify devices on a network using an addressing system. It was the first version of IP deployed for production in the ARPANET in 1983. IP address 200, as an IPv4 address, uses a 32-bit address scheme to store 232 addresses which is more than 4 billion addresses. IPv4 addresses, such as IPv4 address 200, is considered the primary Internet Protocol and carries 94% of Internet traffic. IPv4 addresses, such as IPv4 address 200, are used to provide a connectionless protocol used in packet-switched layer networks, such as Ethernet. IPv4 provides the logical connection between network devices by providing identification for each device.

IPv4 address 200 is shown written in decimal digits, formatted as four 8-bit fields that are separated by periods. Each 8-bit field represents a byte of IPv4 address 200. This form of representing the bytes of IPv4 address 200 is often referred to as the dotted-decimal format. The bytes of IPv4 address 200 are further classified into two parts: the network part 210 and the host part 212. The network part 210 specifies the unique number that is assigned to a network. The network part 210 also identifies the class of network that is assigned. In FIG. 2A, the network part 210 occupies two bytes of IPv4 address 200. Host Part 212 is the part of IPv4 address 200 that is assigned to each host. The host part 212 uniquely identifies a machine on a network. Note that for each host on a network, the network part 210 of IPv4 address 200 is the same, but the host part 212 is different.

Figure 2B:
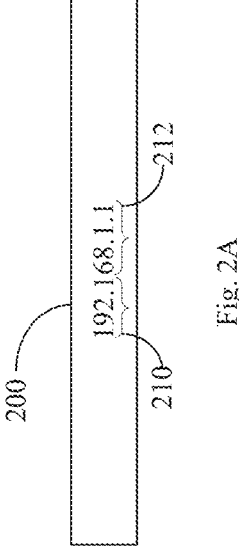
FIG. 2B shows an IP version 6 (IPv6) address 50 according to at least one embodiment.

FIG. 2B shows an IP version 6 (IPv6) address 250 according to at least one embodiment.

IPv6 is the most recent version of the Internet Protocol. IPv6 address 250 uses a 128-bit address space, and thus enables $3.4 \times 10^{38}$ unique IP addresses. Thus, IPv6 addresses, such as IPv6 address 250, resolve the issue of limited IPv4 addresses.

IPv6 addresses, such as IPv6 address 250, are identifiers for individual interfaces and sets of interfaces. IPv6 addresses are assigned to interfaces, not nodes (hosts and routers). Because each interface belongs to a single node, any of the unicast addresses of that node's interfaces' can be used as an identifier for the node. A single interface can be assigned multiple IPv6 addresses of any type.

IPv6 addresses include the following types: unicast, anycast, and multicast. Unicast addresses identify a single interface. Anycast addresses identify a set of interfaces. A packet that is sent to an anycast address is delivered to a member of the set. Multicast addresses identify a group of interfaces. A packet that is sent to a multicast address is delivered to the interfaces in the group. In IPv6, multicast addresses replace broadcast addresses.

IPv6 address 250 is made of 128 bits divided into eight 16-bits blocks. IPv6 address 250 is able to be represented by x:x:x:x:x:x:x:x, where each x is the hexadecimal values of the eight 16-bit pieces of the address. IPv6 addresses range from 0000:0000:0000:0000:0000:0000:0000:0000 to ffff:ffff:ffff:ffff:ffff:ffff:ffff:ffff. Each 16-bit block is then converted into 4-digit Hexadecimal numbers separated by colon symbols.

IPv6 addresses, such as IPv6 address 250, provides a hierarchical addressing and routing infrastructure with stateful and stateless configurations. IPv6 addresses, such as IPv6 address 250, also support quality of service (QOS)

Figures 3A, 3B:
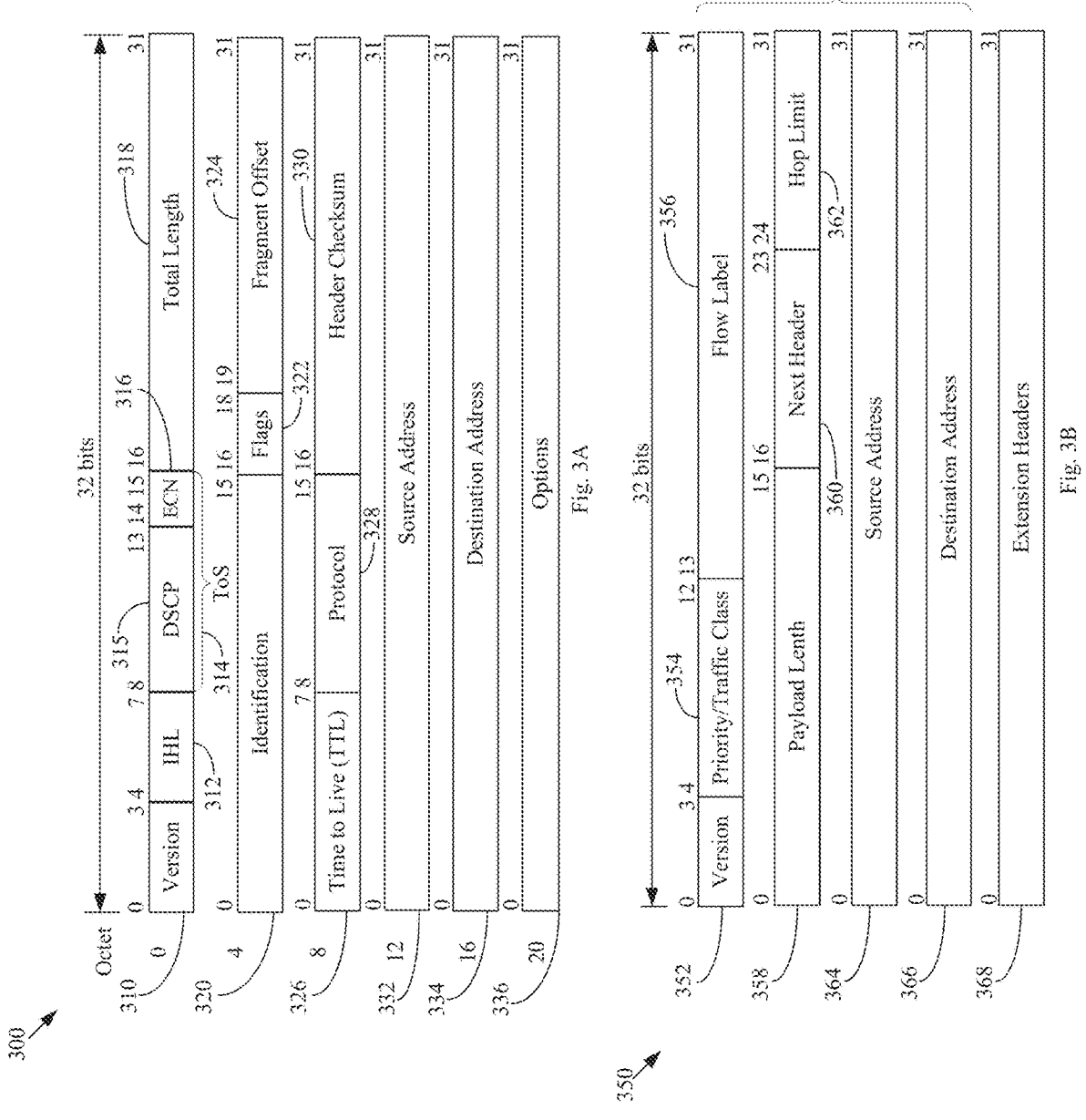
FIG. 3A is an IPv4 Header according to at least one embodiment.
FIG. 3B is an IPv6 Header according to at least one embodiment.

FIG. 3A is an IPv4 Header 300 according to at least one embodiment.

The IPv4 Header 300 is 32 bits wide. The IPv4 Header includes a Version Field 310 that is a 4-bit version indicator. In the case of IPv4, the value of its four bits is set to 0100, which indicates 4 in binary.

The Internet Header Length (IHL) Field 312 is 4 bits in size and represents the number of 32-bit words that are present in the header. IPv4 headers have a variable size, so this is used to specify the size of the header to avoid any errors. The size of IPv4 headers can be between 20 bytes to 60 bytes.

The Type of Service (ToS) Field 314 includes the Differentiated Services Code Point (DSCP) field 315 and the An Explicit Congestion Notification (ECN) Field 316. The ToS Field 314 is used to provide features related to service quality, such as for data streaming or Voice over IP (VOIP) calls. The ToS Field 314 is used to specify how a datagram is to be handled. ECN Field 316 is used to send notifications to the sender or receive in situations where network congestion occurs. The ECN Field 316 is an optional feature of IPv4, and in response to one endpoint not supporting ECN, the ECN Field 316 is not used.

The Total Length Field 318 is 16 bits, and is used to denote the size of the datagram. The minimum size of an IP datagram is 20 bytes, and at the maximum, the Total Length Field 318 is 65,535 bytes. Hosts are able to read 576-byte datagrams. If a datagram is too large for the hosts in the network, fragmentation is used, which is handled in the host or packet switch.

The Identification (ID) Field 320 uniquely identifies fragments of an IP datagram.

Flags Field 322 is a three-bit field that is used to control and identify fragments. The Flags Field 322 is able to have the following configurations: Bit 0: this is reserved and has to be set to zero, Bit 1: DF or do not fragment, Bit 2: MF or more fragments.

The Fragment Offset Field 324 is 13 bits long, and is measured by 8-byte blocks. The Fragment Offset Field 324 is used to specify the offset of a fragment relative to the start of the IP datagram before being fragmented. The first offset of a fragment is set to zero. The maximum possible offset is $(2^{13}-1)*8=65528$, which is more than the maximum possible IP packet length, which, including the length of the header, is 65,535 bytes.

The Time to Live (TTL) Field 326 is an 8-bit field to indicate the maximum time the datagram will be live in the Internet system. The time here is measured in seconds, and in case the value of TTL is zero, the datagram is erased. Every time a datagram is processed, the value in the Time to Live Field 326 for that datagram is decreased by one second. TTL Field 326 is used so that datagrams that are not delivered are discarded automatically. The value of the TTL Field 326 is a value between 0-255.

Protocol Field 328 is reserved to denote which protocol is being used in the later (data) portion of the datagram. For Example, number 6 is used to denote TCP and 17 is used to denote UDP protocol.

The Header Checksum Field 330 is of 16-bit length field that is used to check the header for any errors. The header is compared to the value of the Header Checksum Field 330 at each hop, and in response to the value of the Header Checksum Field 330 not matching the header, the packet is discarded. When the value in the TTL Filed 326 is decremented, the Header Checksum Field 330 is also updated. This can be done "algebraically" by adding a 1 in the correct place to compensate, but the value of the Header Checksum Field 330 is able to be recalculated. The Header Checksum Field 330 is only applicable to the header, and the data field is checked separately. UDP and TCP, for example, have their own checksum fields.

The Source Address Field 332 is a 32-bit address of the source of the IPv4 packet. The Destination Address Field 334 is a 32 bit address of the receiver's address. The Options Field 336 is used when the value of IHL is set to more than 5. These options contain values and settings for things related to security, record route, time stamp, etc.

FIG. 3B is an IPv6 Header 350 according to at least one embodiment.

IPv6 Header 350 includes a Version Field 352 that is 4-bits and indicates the version of Internet Protocol, e.g., bit sequence 0110.

The Traffic Class Field 354 is 8-bits and is used to indicate class or priority of the IPv6 packet. The Traffic Class Field 356 is similar to TOS Field 314 of IPv4 Header 300 in FIG. 3A. The Traffic Class Field 354 helps routers to handle the traffic based on the priority of the packet. In response to congestion occurring, then packets with the least priority will be discarded. Currently, 4-bits are used with the values of 0 to 7 being assigned to congestion controlled traffic and 8 to 15 being assigned to uncontrolled traffic. Uncontrolled data traffic is used for audio/video data. Higher priority is given to uncontrolled data traffic. The source node is allowed to set the priorities, but along the way, routers are able to change the priority. Therefore, the destination does not expect the same priority which was set by the source node.

The Flow Label Field 356 is 20-bits and is used by a source to label the packets belonging to the same flow in order to request handling by intermediate IPv6 routers, such as non-default quality of service or real-time service. In order to distinguish the flow, an intermediate router can use the source address, a destination address, and flow label of the packets. Between a source and destination, multiple flows may exist because many processes might be running at the same time. Routers or Host that do not support the functionality of the Flow Label Field 356, and for default router handling, the Flow Label Field 356 is set to 0. While setting up the flow label, the source specifies the lifetime of the flow.

The Payload Length Field 358 is a 16-bit (unsigned integer) field that is used to indicate the total size of the payload. Payload Length Field 358 tells routers about the amount of information a particular packet contains in its payload. The Payload Length Field 358 includes extension headers (if any) and an upper-layer packet. In case the length of the payload is greater than 65,535 bytes (payload up to 65,535 bytes can be indicated with 16-bits), then the payload length field will be set to 0 and the jumbo payload option is used in the Hop-by-Hop options extension header.

The Next Header Field 360 is 8-bits and is used to indicate the type of extension header (if present) immediately following the IPv6 header. In some cases, the Next Header Field 360 indicates the protocols contained within upper-layer packets, such as TCP, UDP.

The Hop Limit Field 362 is 8-bits, and functions the same as TTL Field 326 in IPv4 Header 300 of FIG. 3A. The Hop Limit Field 362 indicates the maximum number of intermediate nodes that the IPv6 packet is allowed to travel. The value of the Hop Limit Field 362 is decreased by one, by each node that forwards the packet, and the packet is discarded in response to the value being decremented to 0. Thus, packets that are stuck in an infinite loop because of some routing error are able to be discarded.

To enable communication in an IPv6 environment, the IPv6 usage settings are enabled on the host, e.g., Logstash.

The Source Address Field 364 is a 32-bit address of the source of the IPv6 packet. The Destination Address Field 366 is a 32 bit address of the receiver's address. The Extension Headers Field 368 is used to provide supplementary information used by network devices (such as routers, switches, and endpoint hosts) to decide how to direct or process an IPv6 packet. The length of each extension header is an integer multiple of 8 octets. This allows subsequent extension headers to use 8-octet structures.

Figure 4:
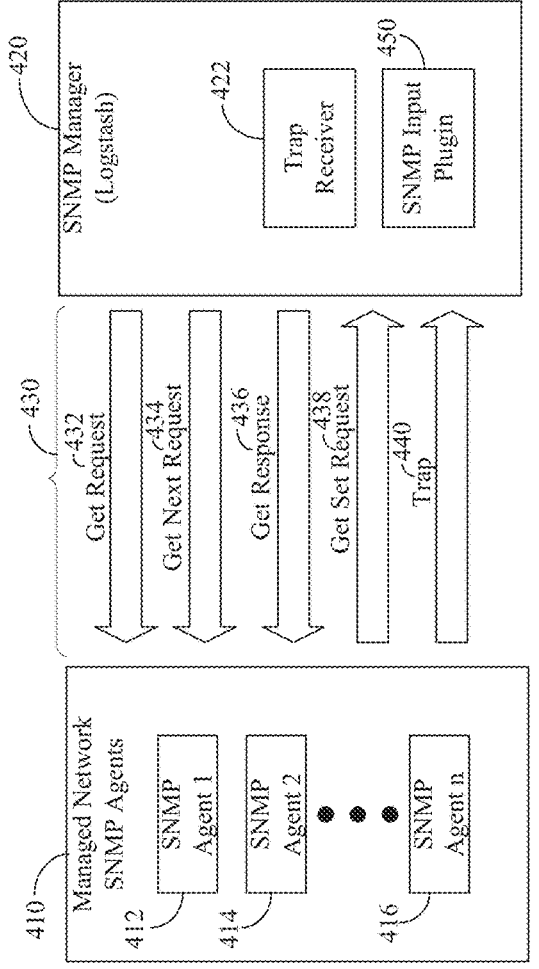
FIG. 4 illustrates the operation of Simple Network Management Protocol (SNMP) according to at least one embodiment.
Figure 4:

FIG. 4 illustrates the operation of Simple Network Management Protocol (SNMP) 400 according to at least one embodiment.

In FIG. 4, Managed Network of SNMP Agents 410 includes one or more SNMP Agents, SNMP Agent 1 412, SNMP Agent 2 414, SNMP Agent n 416. SNMP is used by different devices (Routers, Switches, Printers, etc.) on the network to check each other's activity and communicate important information. SNMP relies on an architecture which includes an SNMP Manager 420 and SNMP Agents 410. SNMP Manager 420, such as Logstash, is a machine on the network that is running SNMP to collect and process information from SNMP Agents 410 on a managed network. SNMP Agents 410 include Servers, Routers, Switches, Desktops, or any other Equipment.

SNMP requests 430 can be either Get or Set type. The types of SNMP messages 430 are encoded into messages referred to as Protocol Data Units (PDUs), which are interchanged between SNMP Agents 410 and a SNMP Manager 420 to support communication.

Get Request 432 returns the value of a named object. Specific values can be fetched to determine the performance and state of SNMP Agents 410, without logging into the device or establishing a TCP connection with the SNMP Agents 410. The requested parameters are identified with OID (Object Identifier). Mappings between OID numbers and parameters are stored in a tree formatted hierarchical database called Management Information Base (MIB). To enable SNMP query of a certain parameter, the SNMP Manager 420 and the SNMP Agents 410 have respective OID available in their MIB.

Get Next Request 434 returns the next name (and value) of the next object supported by a network device given a valid SNMP name. Get Next Request 434 allows the SNMP Manager 420 to review SNMP values of SNMP Agents 410 to determine names and values that an operant device supports.

Thus, GET Request 432/Get Next Request 434 messages are sent by the SNMP Manager 420 to retrieve information from SNMP Agents 410.

The Get Response 436 is used by a SNMP Agents 410 to send back the values of actions requested in a Get Request 432 or Get Next Request 434 message from the SNMP Manager 420. In response to a SNMP Manager 420 wanting to ask SNMP Agents 410 for data with a Get Request 432, SNMP Agents 410 send back a Get Response 436.

A Get Set Request 438 sets a named object to a specific value. Get Set Request 438 provides a method of configuring and controlling SNMP Agents 410 through SNMP to accomplish activities such as disabling interfaces, disconnecting users, and clearing registers. Thus, Get Set Request 438 are used by the SNMP Manager 420 to modify or assign the value to SNMP Agents 410.

Trap 440 is generated asynchronously by SNMP Agents 410, which can notify SNMP Manager 420 of a problem apart from any polling of the SNMP Agents 410. SNMP Agents 410 on the network are configured to issue SNMP Traps to a SNMP Manager 420 that is awaiting Traps 440.

SNMP Manager 420 includes Trap Receiver 422. SNMP Traps 440 are the most frequently used alert messages sent from a remote SNMP-enabled device (an SNMP Agent 410) to a central collector, e.g., SNMP manager 420. In Logstash, the Input Stage listens or monitors devices for the receipt of SNMP Traps 440. For instance, SNMP Trap 440 are able to report an event of overheating in a machine. SNMP Traps 440 are triggered instantaneously by a SNMP Agent 410, rather than waiting for a status request from the SNMP Manager 420.

There are two different methods used to encode alarm data in SNMP Traps 436. The first method is referred to as "granular traps." Granular traps each have a unique object identifier (OID) number so that SNMP Managers 420 are able to distinguish them from one another. The SNMP Manager 420 getting the SNMP traps 436 from SNMP Agents 410, 412, 414 will store the OID in a translation file, which is known as the Management Information Base (MIB). Because the granular traps use unique numbers and the details are available in the MIB, no actual information about the alert needs to be contained within the SNMP Trap 440. So, SNMP Manager 420 uses OID to look up the information in MIB. This approach prevents the SNMP Traps 440 from sending redundant information through the network, and they consume very little bandwidth.

The second type of SNMP Traps 440 are configured to contain information about the alerts as payloads. To understand these types of traps, the SNMP Manager 420 analyzes the data contained in a SNMP Trap 440. Data is stored within an SNMP Trap 440 in a simple key-value pair configuration. A key-value pair is known as a "variable binding" that provides extra information related to the SNMP Trap 440. As an example, a SNMP Trap 440 is able to have the variable bindings for "site name," "severity," and "alarm description." The SNMP Input Plugin 450 for Logstash creates events based on SNMP Traps 440. Logstash acts as a listener for the SNMP Traps 440.

Figure 5:
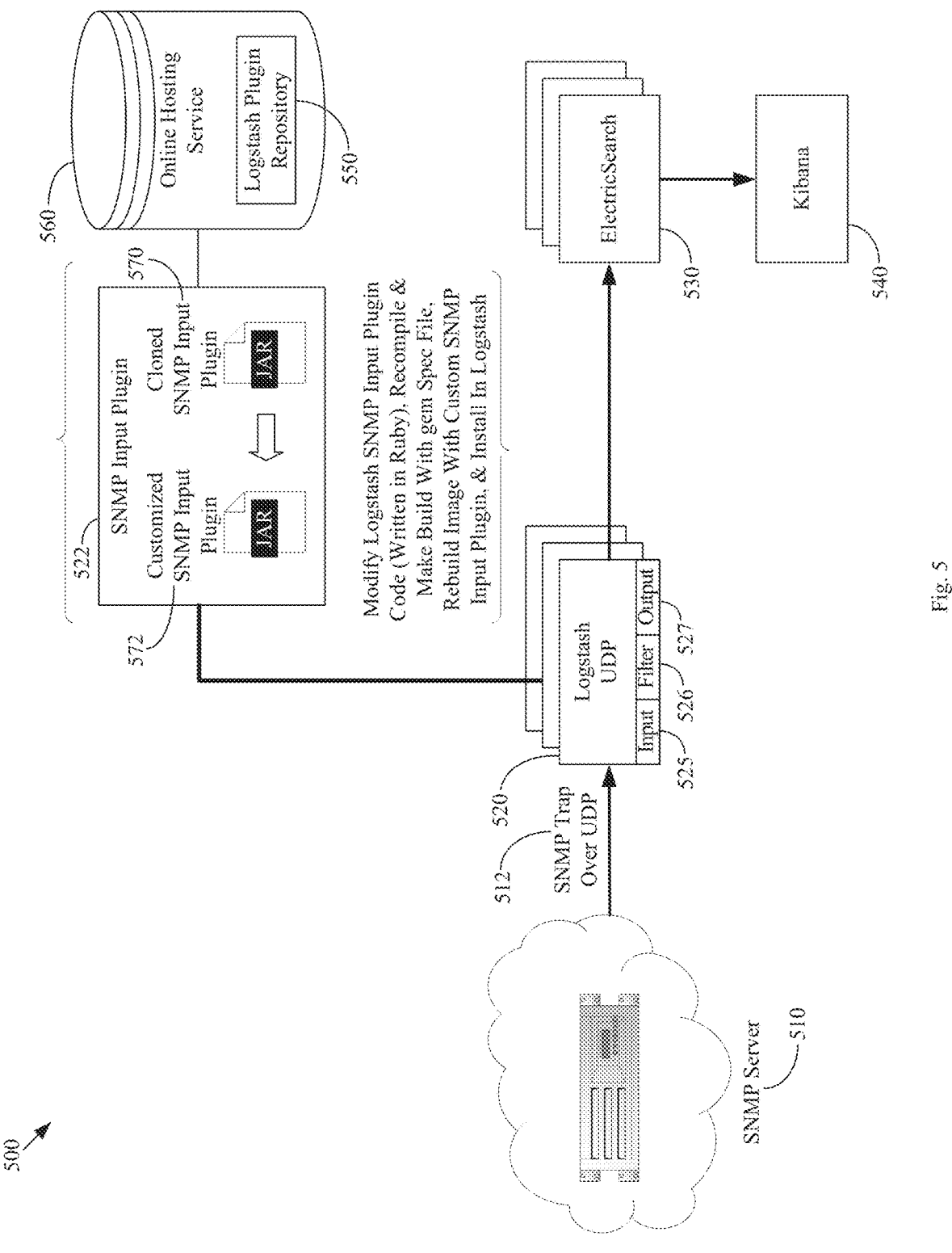
FIG. 5 is a diagram of a logging system according to at least one embodiment.

FIG. 5 is a diagram of a logging system 500 according to at least one embodiment.

In FIG. 5, an SNMP Server 510 generates SNMP Traps over UDP 512 in response to detection of issues or events defined in an organizational model for a managed network system. SNMP is used to detect and address failures in devices and connections for the purpose of maintaining compliance and network security.

SNMP Server 510 uses UDP as its transport protocol. Each instance of a SNMP Traps 512 is serialized, e.g., encoded onto a single UDP over IPv4 datagram. UDP datagrams are transmitted without provision for an acknowledgment. UDP is connectionless because there is no virtual connection between sender and receiver so that SNMP Server 510 transmits data Logstash 520 without establishing a connection beforehand.

The SNMP Server 510 acts as an SNMP Agent that sends alert messages, i.e., SNMP Traps over UDP 512, to a central collector, e.g., Logstash 520, SNMP Traps 512 are asynchronous, unpacked messages used to notify Logstash 520 of significant issues and events associated with devices in the managed network system. For example, an SNMP Trap 512 is able to indicate that a managed device is overheating. For example, SNMP Trap 512 is the main form of communication between SNMP monitoring tools—an SNMP Agent and an SNMP Manager. A benefit of using SNMP Traps 512 for monitoring and managing alarms is that SNMP Traps 512 trigger instantaneously, rather than waiting for a status request from the manager, e.g., Logstash 520.

Logstash 520 is the data collection pipeline tool. It collects data inputs and feeds into the Elasticsearch 530. Logstash 520 gathers data from the different sources and makes it available for further use. Logstash 520 can unify data from disparate sources and normalize the data into predetermined destinations, e.g., ElasticSearch 530. Logstash 520 allows cleaning and democratizing data for analytics and visualization of use cases.

Logstash 520 includes of three stages. Input 525 passes logs to process them into a machine understandable format. Input 525 allows different inputs for logs. Filters 526 provide a set of conditions to perform a particular action or event on the data. Filters 526 provide filtering and parsing of logs. Output 527 is a decision maker that process events or logs. Events are passed through each stage using internal queues.

Logstash 520 offers centralized data processing and enables analysis of a large variety of structured/unstructured data and events. Input Plugins are available for Input 525 to connect with various types of input sources and platforms.

ElasticSearch 530 is a NoSQL database. ElasticSearch 530 is built with RESTful APIs, and offers simple deployment, maximum reliability, and easy management. ElasticSearch 530 supports the use of advanced queries to perform detailed analysis and stores data centrally. ElasticSearch 530 is able to execute quick searches. ElasticSearch 530 also supports storage, searching, and analysis of large volumes of data and provides the underlying engine to power applications for searches. ElasticSearch 530 is written using Java and is used to index heterogeneous data. ElasticSearch 530 has a REST API web-interface with JSON output.

ElasticSearch 530 stores schema-less data and also creates a schema for data that ElasticSearch 530 receives. Data is able to be manipulated record by record with the help of multi-document APIs. Data is able to be filtered and queried for insights. ElasticSearch 530 provides horizontal and vertical scalability, reliability, and multitenant capability for real-time use of indexing to provide rapid search results.

Within ElasticSearch 530, a cluster is a collection of nodes which together holds data and provides joined indexing and search capabilities. A node is an instance of ElasticSearch 530 and is created when an ElasticSearch 530 instance begins. An index is a collection of documents which has similar characteristics, e.g., customer data, product catalog, etc. ElasticSearch 530 is useful for performing indexing, searching, updating, and deletion operations. Many indexes are able to be defined in a single cluster. A document is the basic unit of information that is able to be indexed. A document is expressed in JSON (key: value) pair, and is associated with a type and a unique ID. Every index is able to be split into several shards to be able to distribute data. The shard is the atomic part of an index, which can be distributed over the cluster in response to a user wanting to add more nodes.

Kibana 540 provides data visualization. For example, Kibana 540 provides visualization of documents in the Elasticsearch 530 and helps developers to have a quick insight into the data. Kibana 540 presents a dashboard that offers various interactive diagrams, geospatial data, and graphs to visualize complex quires. Thus, Kibana 540 is able to be used for search, view, and interact with data stored in directories of Elasticsearch 530. Kibana 540 is used to perform advanced data analysis and visualize data in a variety of tables, charts, and maps. The dashboard presented by Kibana 540 is configurable to slice and dice logs of Logstash 520 in ElasticSearch 530. Kibana 540 also enables historical data to be presented in the form of graphs, charts, etc.

To process SNMP Traps 512 at Logstash 520, SNMP Input Plugin 522 is used at Input Stage 525 of the Logstash pipeline to gather data in SNMP Traps Over UDP 512 received from SNP Server 510. However, SNMP Input Plugin 522 does not work in an IPv6 environment. The SNMP Input Plug 522 is written in the Ruby programming language. In Ruby, classes are used to hold data, in the form of variables and constants. The logs of Logstash 520 show an error in snmptrap.rb classes in the SNMP Input Plugin. For example, Logstash cannot use SNMP Input Plugin with IPv6 because Logstash does not include support for IPv6, i.e., configurations to SNMP Input Plugin have not been made to enable ipv6 support. The notation of IPv4 is different from IPv6, which causes validation to fail in response to the network type being changed from IPv4 to IPv6. For example, an IPv4 address, e.g., 192.168.1.1, is able to be parsed, but support for IPv6 parsing an type address, e.g., 2001:db8:1f70:999:de8:7648:3a49:6e8, is not included and thus an error is generated in the Logstash logs.

Numerous plugins are maintained in separate GitHub repositories to enable customization of Logstash 520. The plugins for Logstash 520 are used to extend the functionality of Logstash 520. To enable the SNMP Input Plugin 522 to work in an IPv6 environment, the SNMP Input Plugin 522 is modified.

First, the code for the SNMP Input Plugin 570 is downloaded from an Logstash Plugin Repository 550 in an online hosting service 560, such as GitHub. As mentioned, the SNMP Input Plugin 570 is written in the Ruby programming language. The SNMP Input Plugin 570 is cloned from the Logstash Plugin Repository 550 and stored locally.

The code of the cloned copy of the SNMP Input Plugin 570 is debugged to identify modifications to make to the cloned copy of the SNMP Input Plugin to enable operation in an IPv6 environment. One or more classes and methods for SNMP IPv6 issues of the cloned SNMP Input Plugin Code 570 are identified.

The code for the cloned copy of the SNMP Input Plugin 570 is updated to implement the modifications to enable operation in the IPv6 environment. For example, the IP family configuration is updated by adding "config :host, :validate=>:string, :default=>"0.0.0.0", :use_IPv6=>true" in the listener Ruby code. This is how configurations are defined in the ruby code for the SNMP listener. IP family configuration refers to the type of IP, e.g., IPv4 or IPv6.

The updated SNMP Input Plugin 570 is recompiled and a custom SNMP Input Plugin image 572 is generated. For example, the gem build command, "gem build logstash-input-snmptrap", is run to recompile and create a custom SNMP Input Plugin 572. The output of the gem build command is the file "logstash-input-snmptrap.gem."

The custom SNMP Input Plugin 572 is installed in Logstash 520. For example, the gem file "logstash-input-snmptrap-3.0.6.gem" is copied to a location such as/tmp/logstash-input-snmptrap-3.0.6.gem and the custom SNMP Input Plugin 572 is installed in Logstash 520 by running bin/logstash-plugin install/tmp/logstash-input-snmptrap-3.0.6.gem. In response to rebuilding, the configurations of the custom SNMP Input Plugin 572 are reflected in Logstash 520. Deployment and testing is accomplished by requesting SNMP Server 510 to send the data over UDP port and host to the custom SNMP Input Plugin 572 of Logstash 520 for processing by Logstash 520.

Logstash 520 with custom SNMP Input Plugin 572 installed is deployed and tested in the IPv6 environment to determine whether Logstash 520 works with SNMP in an IPv6 environment. In response to determining that Logstash 520 with custom SNMP Input Plugin 572 installed still has issues with SNMP in an IPv6 environment, the custom SNMP Input Plugin 572 is debugged to identify one or more additional classes and methods causing the custom SNMP Input Plugin 572 to not work in the IPv6 environment. In response to determining that Logstash 520 with custom SNMP Input Plugin 572 installed is working in the IPv6 environment, Logstash is run with the custom SNMP Input Plugin 572 installed and no further modifications to the custom SNMP Input Plugin 572 are made. Logstash is released for use in the IPv6 environment.

The custom SNMP Input Plugin 572 that is now installed in Logstash 520 is able to process SNMP Traps 512 in the IPv6 environment without generating errors. The custom SNMP Input Plugin 572 has the advantages of producing faster results, providing a value addition in open source components, reducing cost, and saving time.

Figure 6:
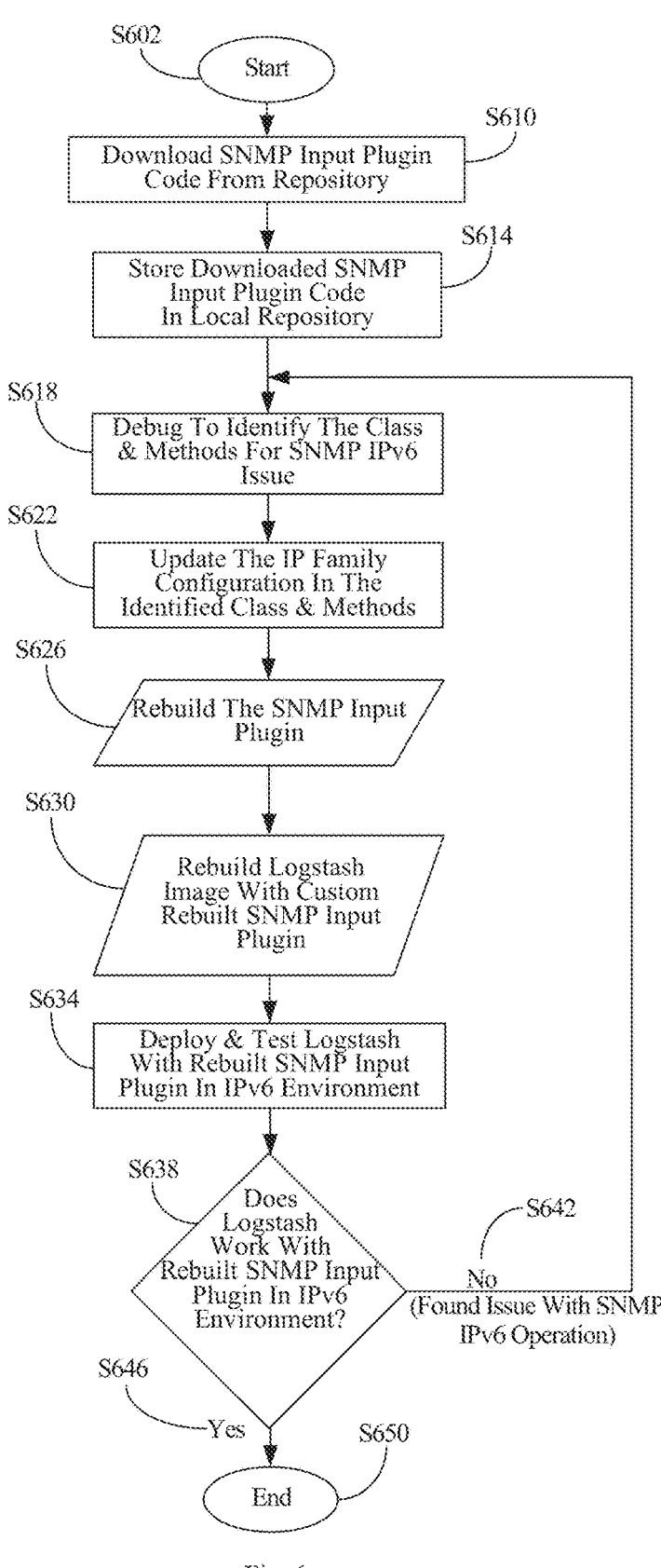
FIG. 6 is a flowchart of a method for customizing Logstash SNMP input plugin to work in an IPv6 environment according to at least one embodiment.

FIG. 6 is a flowchart 600 of a method for customizing Logstash SNMP input plugin to work in an IPv6 environment according to at least one embodiment.

In FIG. 6, the method starts S602 and SNMP Input Plugin Code is downloaded from an online repository S610. Referring to FIG. 5, the code for the SNMP Input Plugin 570 is downloaded from an Logstash Plugin Repository 550 in an online hosting service 560, such as GitHub. As mentioned, the SNMP Input Plugin 570 is written in the Ruby programming language.

The downloaded SNMP Input Plugin Code is stored in a local repository S614. Referring to FIG. 5, the SNMP Input Plugin 570 is cloned from the Logstash Plugin Repository 550 and stored locally.

The downloaded SNMP Input Plugin Code is debugged to identify the one or more classes and methods to support SNMP in an IPv6 environment S618. The one or more classes and methods for SNMP IPv6 issues are identified. Referring to FIG. 5, the cloned SNMP Input Plugin Code 570 is debugged to identify modifications to make to the cloned copy of the SNMP Input Plugin to enable operation in an IPv6 environment. One or more classes and methods for SNMP IPv6 issues of the cloned SNMP Input Plugin Code 570 are identified.

The IP family configuration in the identified one or more classes and methods in the SNMP Input Plugin Code are updated S622. Referring to FIG. 5, the code for the cloned copy of the SNMP Input Plugin 570 is updated to implement the modifications to enable operation in the IPv6 environment. For example, the IP family configuration is updated by adding "config :host, :validate=>:string, :default=>"0.0.0.0", :use_IPv6=>true" in the listener Ruby code. This is how configurations are defined in the ruby code for the SNMP listener. IP family configuration refers to the type of IP, e.g., IPv4 or IPv6.

The SNMP Input Plugin Code is rebuilt S626. Referring to FIG. 5, the updated SNMP Input Plugin 570 is recompiled and a custom SNMP Input Plugin image 572 is generated. For example, the gem build command, "gem build logstash-input-snmptrap", is run to recompile and create a custom SNMP Input Plugin 572. The output of the gem build command is the file "logstash-input-snmptrap.gem."

The Logstash image is rebuilt with the custom rebuilt input plugin S630. Referring to FIG. 5, the custom SNMP Input Plugin 572 is installed in Logstash 520. For example, the gem file "logstash-input-snmptrap-3.0.6.gem" is copied to a location such as/tmp/logstash-input-snmptrap-3.0.6.gem and the custom SNMP Input Plugin 572 is installed in Logstash 520 by running bin/logstash-plugin install/tmp/logstash-input-snmptrap-3.0.6.gem. In response to rebuilding, the configurations of the custom SNMP Input Plugin 572 are reflected in Logstash 520. Deployment and testing is accomplished by requesting SNMP Server 510 to send the data over UDP port and host. The custom SNMP Input Plugin 572 that is now installed in Logstash 520 is able to process SNMP Traps 512 in the IPv6 environment without generating errors.

Logstash is deployed and tested with SNMP in an IPv6 environment S634. Referring to FIG. 5, Logstash 520 with custom SNMP Input Plugin 572 installed is deployed and tested in the IPv6 environment to determine whether Logstash 520 works with SNMP in the ipv6 environment.

A determination is made to determine whether Logstash works with SNMP in the IPv6 environment S638. Referring to FIG. 5, Logstash 520 with custom SNMP Input Plugin 572 installed is deployed and tested in the IPv6 environment to determine whether Logstash 520 works with SNMP in the ipv6 environment.

In response to determining that Logstash with custom SNMP Input Plugin installed still has issues with SNMP in the IPv6 environment S642, the process loops back to debug SNMP Input Plugin Code to identify the one or more classes and methods to support SNMP in an IPv6 environment S618. Referring to FIG. 5, in response to determining that Logstash 520 with custom SNMP Input Plugin 572 installed still has issues with SNMP in an IPv6 environment, the custom SNMP Input Plugin 572 is debugged to identify one or more additional classes and methods causing the custom SNMP Input Plugin 572 to not work in the IPv6 environment.

In response to Logstash working with SNMP in an IPv6 environment S646, the process ends S650. Referring to FIG. 5, in response to determining that Logstash 520 with custom SNMP Input Plugin 572 installed is working in the IPv6 environment, Logstash is run with the custom SNMP Input Plugin 572 installed and no further modifications to the custom SNMP Input Plugin 572 are made. Logstash is released for use in the IPv6 environment.

At least one embodiment of the method for customizing a Logstash SNMP input plugin to work in an IPv6 environment includes debugging a cloned copy of a Logstash SNMP Input Plugin to identify modifications to make to the cloned copy of the Logstash SNMP Input Plugin to enable operation in an IPv6 environment, updating the cloned copy of the Logstash SNMP Input Plugin to implement the modifications to enable operation in the IPv6 environment, recompiling the updated cloned copy of the Logstash SNMP Input Plugin to generate a custom SNMP Input Plugin, installing the custom SNMP Input Plugin into Logstash, deploying and testing Logstash in the IPv6 environment with the custom SNMP Input Plugin installed, in response to the deploying and testing determining that Logstash works in the IPv6 environment with the custom SNMP Input Plugin installed, releasing Logstash with the custom SNMP Input Plugin installed for use in the IPv6 environment, and in response to the deploying and testing determining Logstash has issues with SNMP in the IPv6 environment, debugging the custom SNMP Input Plugin to identify one or more additional classes and methods of the custom SNMP Input Plugin causing the custom SNMP Input Plugin to not work in the IPv6 environment.

Figure 7:
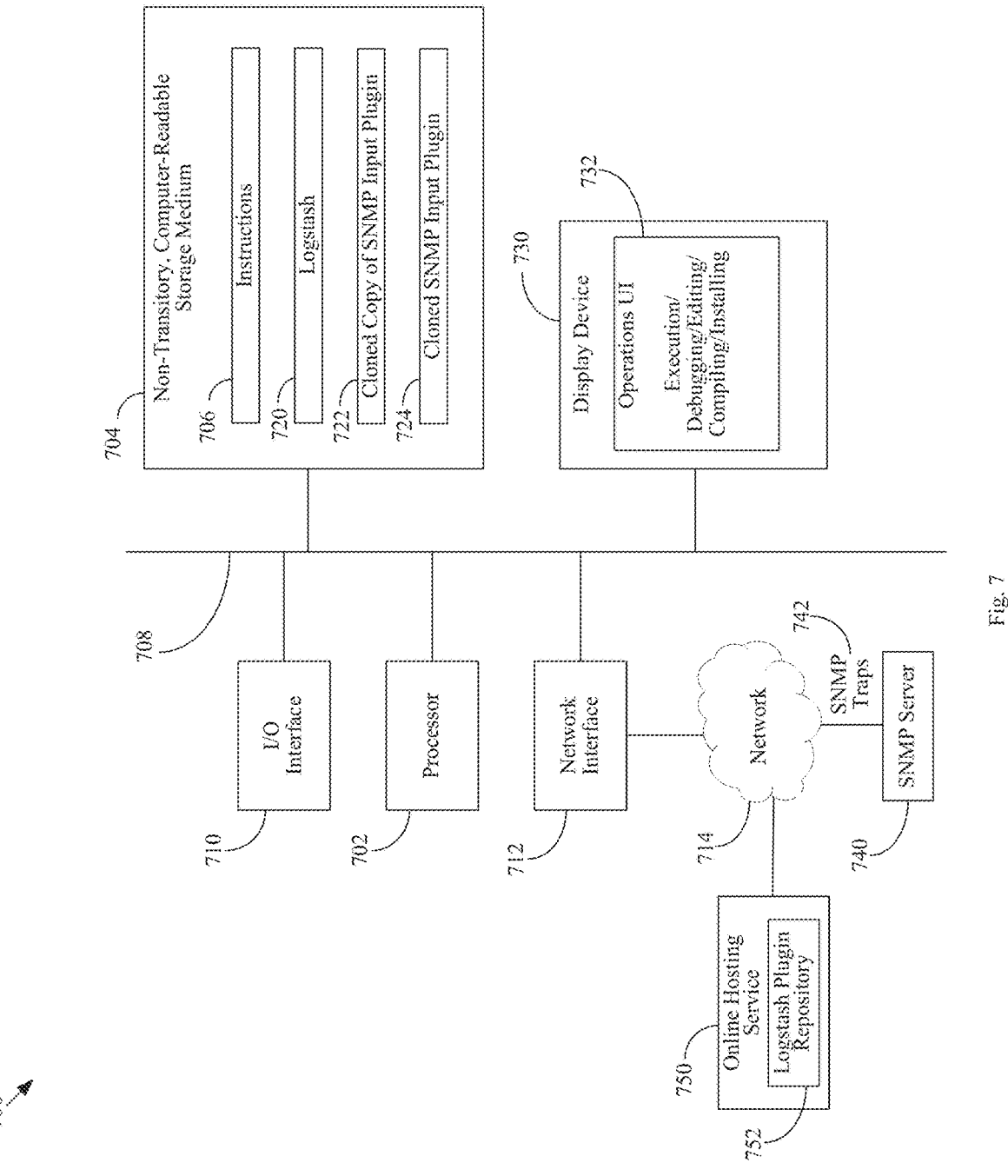
FIG. 7 is a high-level functional block diagram of a processor-based system according to at least one embodiment.

FIG. 7 is a high-level functional block diagram of a processor-based system 700 according to at least one embodiment.

In at least one embodiment, processing circuitry 700 provides customization of Logstash SNMP input plugin to enable operation in an IPv6 environment. Processing circuitry 700 implements customization of Logstash SNMP input plugin to enable operation in an IPv6 environment using processor 702. Processing circuitry 500 also includes a non-transitory, computer-readable storage medium 704 that is used to customize Logstash SNMP input plugin to enable operation in an IPv6 environment. Storage medium 704, amongst other things, is encoded with, i.e., stores, instructions 706, i.e., computer program code that are executed by processor 702 causes processor 702 to perform operations for running Logstash 720 and for customizing Logstash SNMP input plugin to enable operation in an IPv6 environment. Execution of instructions 706 by processor 702 represents (at least in part) an application which implements at least a portion of the methods described herein in accordance with one or more embodiments (hereinafter, the noted processes and/or methods).

Processor 702 is electrically coupled to computer-readable storage medium 704 via a bus 708. Processor 702 is electrically coupled to an Input/output (I/O) interface 710 by bus 708. A network interface 712 is also electrically connected to processor 702 via bus 708. Network interface 712 is connected to a network 714, so that processor 702 and computer-readable storage medium 704 connect to external elements via network 714. Processor 702 is configured to execute instructions 706 encoded in computer-readable storage medium 704 to cause processing circuitry 700 to be usable for performing at least a portion of the processes and/or methods. In one or more embodiments, processor 702 is a Central Processing Unit (CPU), a multi-processor, a distributed processing system, an Application Specific Integrated Circuit (ASIC), and/or a suitable processing unit.

Processing circuitry 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

Processing circuitry 700 also includes network interface 712 coupled to processor 702. Network interface 712 allows processing circuitry 700 to communicate with network 714, to which one or more other computer systems are connected. Network interface 712 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 700 is configured to receive information through I/O interface 710. The information received through I/O interface 710 includes one or more of instructions, data, design rules, libraries of cells, and/or other parameters for processing by processor 702. The information is transferred to processor 702 via bus 708. Processing circuitry 700 is configured to receive information related to a User Interface (UI) through I/O interface 710. The information is stored in computer-readable medium 704 as UI 722.

In one or more embodiments, one or more non-transitory computer-readable storage media 704 having stored thereon instructions (in compressed or uncompressed form) that may be used to program a computer, processor, or other electronic device) to perform processes or methods described herein. The one or more non-transitory computer-readable storage media 704 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 704 includes a Compact Disk-Read Only Memory (CD-ROM), a Compact Disk-Read/Write (CD-R/W), and/or a Digital Video Disc (DVD).

In one or more embodiments, storage medium 704 stores code for implementing an instance of Logstash 720. A user is able to initiate execution of Logstash 720 by Processor 702 from Display Device 730. Display Device 730 provides Operations User Interface (UI) 732, such as execution, debugging, editing, compiling, installing, etc. SNMP Server 740 provides Logstash 720 SNMP Traps 742 over UDP. A user is able to access Online Hosting Service 750 via Operations UI 732. Online Hosting Service 750 maintains logstash plugins in Logstash Plugin Repository 752. In at least one embodiment, a user is able, via Processor 702, to use Operations UI 732 to download and Clone a Copy of SNMP Input Plugin 732 from Logstash Plugin Repository 752. From Operations UI 732, the user debugs Cloned Copy of SNMP Input Plugin 722 to identify modifications to make to Cloned Copy of SNMP Input Plugin 722 to enable operation in an IPv6 environment. Via Operations UI 732, the user updates Cloned Copy of SNMP Input Plugin 722 to implement the modifications to enable operation in the IPv6 environment, and recompiles the updated Cloned Copy of SNMP Input Plugin 722 to generate Custom SNMP Input Plugin 724. Via Operations UI 732, the user then installs Custom SNMP Input Plugin 724 into Logstash 720. After installing Custom SNMP Input Plugin 724 into Logstash 720, the user deploys and tests Custom SNMP Input Plugin 724 of Logstash 720 in the IPv6 environment. In response to the deploying and testing determining that Logstash 720 with Custom SNMP Input Plugin 724 installed works in the IPv6 environment, Logstash 720 with Custom SNMP Input Plugin 724 installed for use in the IPv6 environment. In response to the deploying and testing determining that Custom SNMP Input Plugin 724 installed in Logstash still has issues with SNMP in the IPv6 environment, Custom SNMP Input Plugin 724 is debugged via Operations UI 732 to identify one or more additional classes and methods of Custom SNMP Input Plugin 724 causing Custom SNMP Input Plugin 724 to not work in the IPv6 environment. Thus, the user is able to create Custom SNMP Input Plugin 724 and verify that Custom SNMP Input Plugin 724 is able to process SNMP Traps 742 from SNMP Server 740 without encountering errors.

In one or more embodiments, storage medium 704 stores computer program code 706 configured to cause processing circuitry 700 to perform at least a portion of the processes and/or methods for customizing Logstash SNMP input plugin to enable operation in an IPv6 environment. In one or more embodiments, storage medium 704 also stores information, such as algorithm which facilitates performing at least a portion of the processes and/or methods for customizing Logstash SNMP input plugin to enable operation in an IPv6 environment. Accordingly, in at least one embodiment, the processor circuitry 700 performs a method for customizing Logstash SNMP input plugin to enable operation in an IPv6 environment. The process for customizing a Logstash SNMP input plugin to enable operation in an IPv6 environment includes debugging a cloned copy of a Logstash SNMP Input Plugin to identify modifications to make to the cloned copy of the Logstash SNMP Input Plugin to enable operation in an IPv6 environment, updating the cloned copy of the Logstash SNMP Input Plugin to implement the modifications to enable operation in the IPv6 environment, recompiling the updated cloned copy of the Logstash SNMP Input Plugin to generate a custom SNMP Input Plugin, installing the custom SNMP Input Plugin into Logstash, deploying and testing Logstash in the IPv6 environment with the custom SNMP Input Plugin installed, in response to the deploying and testing determining that Logstash works in the IPv6 environment with the custom SNMP Input Plugin installed, releasing Logstash with the custom SNMP Input Plugin installed for use in the IPv6 environment, and in response to the deploying and testing determining Logstash has issues with SNMP in the IPv6 environment, debugging the custom SNMP Input Plugin to identify one or more additional classes and methods of the custom SNMP Input Plugin causing the custom SNMP Input Plugin to not work in the IPv6 environment.

Customization of the Logstash SNMP input plugin to enable operation in an IPv6 environment provides at least the advantages of enabling users to avoid the use of external paid plugins. The custom Logstash SNMP input plugin produces faster results and is a value addition in open source components. The custom Logstash SNMP input plugin also reduces cost and saves time.

In a method according to at least one embodiment, the method for customizing a Logstash SNMP input plugin to work in an IPv6 environment includes debugging a cloned copy of a Logstash SNMP Input Plugin to identify modifications to make to the cloned copy of the Logstash SNMP Input Plugin to enable operation in an IPv6 environment, updating the cloned copy of the Logstash SNMP Input Plugin to implement the modifications to enable operation in the IPv6 environment, recompiling the updated cloned copy of the Logstash SNMP Input Plugin to generate a custom SNMP Input Plugin, installing the custom SNMP Input Plugin into Logstash, deploying and testing Logstash in the IPv6 environment with the custom SNMP Input Plugin installed, in response to the deploying and testing determining that Logstash works in the IPv6 environment with the custom SNMP Input Plugin installed, releasing Logstash with the custom SNMP Input Plugin installed for use in the IPv6 environment, and in response to the deploying and testing determining Logstash has issues with SNMP in the IPv6 environment, debugging the custom SNMP Input Plugin to identify one or more additional classes and methods of the custom SNMP Input Plugin causing the custom SNMP Input Plugin to not work in the IPv6 environment.

In a method according to at least one embodiment, the method further includes cloning the copy of an SNMP Input Plugin from an online repository, and storing the cloned copy of the Logstash SNMP Input Plugin in a local repository prior to the debugging the cloned copy of the Logstash SNMP Input Plugin.

In a method according to at least one embodiment, the debugging the cloned copy of the Logstash SNMP Input Plugin to identify the modifications to make to the cloned copy of the Logstash SNMP Input Plugin to enable operation in the IPv6 environment further includes debugging the cloned copy of the SNMP Input Plugin to identify modifications to make to the one or more classes and methods to support SNMP messages in the IPv6 environment.

In a method according to at least one embodiment, the updating the cloned copy of the Logstash SNMP Input Plugin to implement the modifications to enable operation in the IPv6 environment further includes updating an IP family configuration in the one or more classes and methods to address issues of the cloned copy of the Logstash SNMP Input Plugin not supporting SNMP messages in the IPv6 environment.

In a method according to at least one embodiment, the updating the IP family configuration includes adding config :host, :validate=>:string, :default=>"0.0.0.0", :use_IPv6=>true in the cloned copy of the Logstash SNMP Input Plugin.

In a method according to at least one embodiment, the recompiling the updated cloned copy of the Logstash SNMP Input Plugin to generate the custom SNMP Input Plugin further includes running a gem build command to recompile the updated cloned copy of the Logstash SNMP Input Plugin and to create the custom SNMP Input Plugin as a gem file.

In a method according to at least one embodiment, the installing the custom SNMP Input Plugin into Logstash further includes copying the gem file to a predetermined location and running bin/logstash-plugin install to install the custom SNMP Input Plugin into Logstash.

In at least one embodiment, a system for customizing a Logstash SNMP input plugin to work in an IPv6 environment includes a memory storing computer-readable instructions, and a processor connected to the memory, wherein the processor is configured to execute the computer-readable instructions to debug a cloned copy of a Logstash SNMP Input Plugin to identify modifications to make to the cloned copy of the Logstash SNMP Input Plugin to enable operation in an IPv6 environment, update the cloned copy of the Logstash SNMP Input Plugin to implement the modifications to enable operation in the IPv6 environment, recompile the updated cloned copy of the Logstash SNMP Input Plugin to generate a custom SNMP Input Plugin, install the custom SNMP Input Plugin into Logstash, deploy and test Logstash in the IPv6 environment with the custom SNMP Input Plugin installed, in response to the deploying and testing determining that Logstash works in the IPv6 environment with the custom SNMP Input Plugin installed, release Logstash with the custom SNMP Input Plugin installed for use in the IPv6 environment, and in response to the deploying and testing determining Logstash has issues with SNMP in the IPv6 environment, debug the custom SNMP Input Plugin to identify one or more additional classes and methods of the custom SNMP Input Plugin causing the custom SNMP Input Plugin to not work in the IPv6 environment.

In a system according to at least one embodiment, the processor is further configured to clone the copy of an SNMP Input Plugin from an online repository, and store the cloned copy of the Logstash SNMP Input Plugin in a local repository prior to the debugging the cloned copy of the Logstash SNMP Input Plugin.

In a system according to at least one embodiment, the processor is further configured to debug the cloned copy of the Logstash SNMP Input Plugin to identify the modifications to make to the cloned copy of the Logstash SNMP Input Plugin to enable operation in the IPv6 environment by debugging the cloned copy of the Logstash SNMP Input Plugin to identify modifications to make to the one or more classes and methods to support SNMP messages in the IPv6 environment.

In a system according to at least one embodiment, the processor is further configured to update the cloned copy of the Logstash SNMP Input Plugin to implement the modifications to enable operation in the IPv6 environment by updating an IP family configuration in the one or more classes and methods to address issues of the cloned copy of the Logstash SNMP Input Plugin not supporting SNMP messages in the IPv6 environment.

In a system according to at least one embodiment, the processor is further configured to update the IP family configuration by adding config :host, :validate=>:string, :default=>"0.0.0.0", :use_IPv6=>true in the cloned copy of the Logstash SNMP Input Plugin.

In a system according to at least one embodiment, the processor is further configured to recompile the updated cloned copy of the Logstash SNMP Input Plugin to generate the custom SNMP Input Plugin by running a gem build command to recompile the updated cloned copy of the Logstash SNMP Input Plugin and to create the custom SNMP Input Plugin as a gem file.

In a system according to at least one embodiment, the processor is further configured to install the custom SNMP Input Plugin into Logstash by copying the gem file to a predetermined location and running bin/logstash-plugin install to install the custom SNMP Input Plugin into Logstash.

In at least one embodiment, a non-transitory computer-readable media having computer-readable instructions stored thereon, which when executed by a processor cause the processor to perform operations including debugging a cloned copy of a Logstash SNMP Input Plugin to identify modifications to make to the cloned copy of the Logstash SNMP Input Plugin to enable operation in an IPv6 environment, updating the cloned copy of the Logstash SNMP Input Plugin to implement the modifications to enable operation in the IPv6 environment, recompiling the updated cloned copy of the Logstash SNMP Input Plugin to generate a custom SNMP Input Plugin, installing the custom SNMP Input Plugin into Logstash, deploying and testing Logstash in the IPv6 environment with the custom SNMP Input Plugin installed, in response to the deploying and testing determining that Logstash works in the IPv6 environment with the custom SNMP Input Plugin installed, releasing Logstash with the custom SNMP Input Plugin installed for use in the IPv6 environment, and in response to the deploying and testing determining Logstash has issues with SNMP in the IPv6 environment, debugging the custom SNMP Input Plugin to identify additional one or more classes and methods of the custom SNMP Input Plugin causing the custom SNMP Input Plugin to not work in the IPv6 environment.

In a non-transitory computer-readable media according to at least one embodiment, the computer-readable instructions, when executed by the processor cause the processor to perform further operations includes cloning the copy of an SNMP Input Plugin from an online repository, and storing the cloned copy of the Logstash SNMP Input Plugin in a local repository prior to the debugging the cloned copy of the Logstash SNMP Input Plugin, wherein the debugging the cloned copy of the Logstash SNMP Input Plugin to identify the modifications to make to the cloned copy of the Logstash SNMP Input Plugin to enable operation in the IPv6 environment further comprises debugging the cloned copy of the Logstash SNMP Input Plugin to identify modifications to make to the one or more classes and methods to support SNMP messages in the IPv6 environment.

In a non-transitory computer-readable media according to at least one embodiment, the updating the cloned copy of the Logstash SNMP Input Plugin to implement the modifications to enable operation in the IPv6 environment further includes updating an IP family configuration in the one or more classes and methods to address issues of the cloned copy of the Logstash SNMP Input Plugin not supporting SNMP messages in the IPv6 environment.

In a non-transitory computer-readable media according to at least one embodiment, the updating the IP family configuration includes adding config :host, :validate=>:string, :default=>"0.0.0.0", :use_IPv6=>true in the cloned copy of the Logstash SNMP Input Plugin.

In a non-transitory computer-readable media according to at least one embodiment, the recompiling the updated cloned copy of the Logstash SNMP Input Plugin to generate the custom SNMP Input Plugin further includes running a gem build command to recompile the updated cloned copy of the Logstash SNMP Input Plugin and to create the custom SNMP Input Plugin as a gem file.

In a non-transitory computer-readable media according to at least one embodiment, the installing the custom SNMP Input Plugin into Logstash further includes copying the gem file to a predetermined location and running bin/logstash-plugin install to install the custom SNMP Input Plugin into Logstash.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for customizing a Logstash SNMP input plugin to work in an IPv6 environment, comprising:

debugging a cloned copy of a Logstash SNMP Input Plugin to identify modifications to make to the cloned copy of the Logstash SNMP Input Plugin to enable operation in an IPv6 environment;

updating the cloned copy of the Logstash SNMP Input Plugin to implement the modifications to enable operation in the IPv6 environment;

recompiling the updated cloned copy of the Logstash SNMP Input Plugin to generate a custom SNMP Input Plugin;

installing the custom SNMP Input Plugin into Logstash;

deploying and testing Logstash in the IPv6 environment with the custom SNMP Input Plugin installed;

in response to the deploying and testing determining that Logstash works in the IPv6 environment with the custom SNMP Input Plugin installed, releasing Logstash with the custom SNMP Input Plugin installed for use in the IPv6 environment; and in response to the deploying and testing determining Logstash has issues with SNMP in the IPv6 environment, debugging the custom SNMP Input Plugin to identify one or more additional classes and methods of the custom SNMP Input Plugin causing the custom SNMP Input Plugin to not work in the IPv6 environment.

2. The method of claim 1, further comprising:

cloning the copy of an SNMP Input Plugin from an online repository; and storing the cloned copy of the Logstash SNMP Input Plugin in a local repository prior to the debugging the cloned copy of the Logstash SNMP Input Plugin.

3. The method of claim 1, wherein the debugging the cloned copy of the Logstash SNMP Input Plugin to identify the modifications to make to the cloned copy of the Logstash SNMP Input Plugin to enable operation in the IPv6 environment further comprises debugging the cloned copy of the SNMP Input Plugin to identify modifications to make to the one or more classes and methods to support SNMP messages in the IPv6 environment.

4. The method of claim 1, wherein the updating the cloned copy of the Logstash SNMP Input Plugin to implement the modifications to enable operation in the IPv6 environment further comprises updating an IP family configuration in the one or more classes and methods to address issues of the cloned copy of the Logstash SNMP Input Plugin not supporting SNMP messages in the IPv6 environment.

5. The method of claim 4, wherein the updating the IP family configuration includes adding config :host, :validate=>:string, :default=>"0.0.0.0", :use_IPv6=>true in the cloned copy of the Logstash SNMP Input Plugin.

6. The method of claim 1, wherein the recompiling the updated cloned copy of the Logstash SNMP Input Plugin to generate the custom SNMP Input Plugin further comprising running a gem build command to recompile the updated cloned copy of the Logstash SNMP Input Plugin and to create the custom SNMP Input Plugin as a gem file.

7. The method of claim 6, wherein the installing the custom SNMP Input Plugin into Logstash further comprises copying the gem file to a predetermined location and running bin/logstash-plugin install to install the custom SNMP Input Plugin into Logstash.

8. A system for customizing a Logstash SNMP input plugin to work in an IPv6 environment, comprising:

a memory storing computer-readable instructions; and a processor connected to the memory, wherein the processor is configured to execute the computer-readable instructions to:

debug a cloned copy of a Logstash SNMP Input Plugin to identify modifications to make to the cloned copy of the Logstash SNMP Input Plugin to enable operation in an IPv6 environment;

update the cloned copy of the Logstash SNMP Input Plugin to implement the modifications to enable operation in the IPv6 environment;

recompile the updated cloned copy of the Logstash SNMP Input Plugin to generate a custom SNMP Input Plugin;

install the custom SNMP Input Plugin into Logstash;

deploy and test Logstash in the IPv6 environment with the custom SNMP Input Plugin installed;

in response to the deploying and testing determining that Logstash works in the IPv6 environment with the custom SNMP Input Plugin installed, release Logstash with the custom SNMP Input Plugin installed for use in the IPv6 environment; and in response to the deploying and testing determining Logstash has issues with SNMP in the IPv6 environment, debug the custom SNMP Input Plugin to identify one or more additional classes and methods of the custom SNMP Input Plugin causing the custom SNMP Input Plugin to not work in the IPv6 environment.

9. The system of claim 8, wherein the processor is further configured to clone the copy of an SNMP Input Plugin from an online repository, and store the cloned copy of the Logstash SNMP Input Plugin in a local repository prior to the debugging the cloned copy of the Logstash SNMP Input Plugin.

10. The system of claim 8, wherein the processor is further configured to debug the cloned copy of the Logstash SNMP Input Plugin to identify the modifications to make to the cloned copy of the Logstash SNMP Input Plugin to enable operation in the IPv6 environment by debugging the cloned copy of the Logstash SNMP Input Plugin to identify modifications to make to the one or more classes and methods to support SNMP messages in the IPv6 environment.

11. The system of claim 8, wherein the processor is further configured to update the cloned copy of the Logstash SNMP Input Plugin to implement the modifications to enable operation in the IPv6 environment by updating an IP family configuration in the one or more classes and methods to address issues of the cloned copy of the Logstash SNMP Input Plugin not supporting SNMP messages in the IPv6 environment.

12. The system of claim 11, wherein the processor is further configured to update the IP family configuration by adding config :host, :validate=>:string, :default=>"0.0.0.0", :use_IPv6=>true in the cloned copy of the Logstash SNMP Input Plugin.

13. The system of claim 8, wherein the processor is further configured to recompile the updated cloned copy of the Logstash SNMP Input Plugin to generate the custom SNMP Input Plugin by running a gem build command to recompile the updated cloned copy of the Logstash SNMP Input Plugin and to create the custom SNMP Input Plugin as a gem file.

14. The system of claim 13, wherein the processor is further configured to install the custom SNMP Input Plugin into Logstash by copying the gem file to a predetermined location and running bin/logstash-plugin install to install the custom SNMP Input Plugin into Logstash.

15. A non-transitory computer-readable media having computer-readable instructions stored thereon, which when executed by a processor cause the processor to perform operations comprising:

debugging a cloned copy of a Logstash SNMP Input Plugin to identify modifications to make to the cloned copy of the Logstash SNMP Input Plugin to enable operation in an IPv6 environment;

updating the cloned copy of the Logstash SNMP Input Plugin to implement the modifications to enable operation in the IPv6 environment;

recompiling the updated cloned copy of the Logstash SNMP Input Plugin to generate a custom SNMP Input Plugin;

installing the custom SNMP Input Plugin into Logstash;

deploying and testing Logstash in the IPv6 environment with the custom SNMP Input Plugin installed;

in response to the deploying and testing determining that Logstash works in the IPv6 environment with the custom SNMP Input Plugin installed, releasing Logstash with the custom SNMP Input Plugin installed for use in the IPv6 environment; and in response to the deploying and testing determining Logstash has issues with SNMP in the IPv6 environment, debugging the custom SNMP Input Plugin to identify additional one or more classes and methods of the custom SNMP Input Plugin causing the custom SNMP Input Plugin to not work in the IPv6 environment.

16. The non-transitory computer-readable media of claim 15, further comprising:

cloning the copy of an SNMP Input Plugin from an online repository; and storing the cloned copy of the Logstash SNMP Input Plugin in a local repository prior to the debugging the cloned copy of the Logstash SNMP Input Plugin, wherein the debugging the cloned copy of the Logstash SNMP Input Plugin to identify the modifications to make to the cloned copy of the Logstash SNMP Input Plugin to enable operation in the IPv6 environment further comprises debugging the cloned copy of the Logstash SNMP Input Plugin to identify modifications to make to the one or more classes and methods to support SNMP messages in the IPv6 environment.

17. The non-transitory computer-readable media of claim 15, wherein the updating the cloned copy of the Logstash SNMP Input Plugin to implement the modifications to enable operation in the IPv6 environment further comprises updating an IP family configuration in the one or more classes and methods to address issues of the cloned copy of the Logstash SNMP Input Plugin not supporting SNMP messages in the IPv6 environment.

18. The non-transitory computer-readable media of claim 17, wherein the updating the IP family configuration includes adding config :host, :validate=>:string, :default=>"0.0.0.0", :use_IPv6=>true in the cloned copy of the Logstash SNMP Input Plugin.

19. The non-transitory computer-readable media of claim 15, wherein the recompiling the updated cloned copy of the Logstash SNMP Input Plugin to generate the custom SNMP Input Plugin further comprising running a gem build command to recompile the updated cloned copy of the Logstash SNMP Input Plugin and to create the custom SNMP Input Plugin as a gem file.

20. The non-transitory computer-readable media of claim 19, wherein the installing the custom SNMP Input Plugin into Logstash further comprises copying the gem file to a predetermined location and running bin/logstash-plugin install to install the custom SNMP Input Plugin into Logstash.

* * * * *